(12) United States Patent
Rathunde et al.

(10) Patent No.: US 8,521,853 B2
(45) Date of Patent: Aug. 27, 2013

(54) APPARATUS AND METHOD FOR SERVER NETWORK MANAGEMENT TO PROVIDE ZERO PLANNED RETROFIT DOWNTIME

(75) Inventors: Dale Frank Rathunde, Geneva, IL (US); Paul M. Susa, Naperville, IL (US); Saju George Oommen, Bangalore (IN)

(73) Assignee: Alcatel Lucent, Paris (FR)

( * ) Notice: Subject to any disclaimer, the term of this patent is extended or adjusted under 35 U.S.C. 154(b) by 1054 days.

(21) Appl. No.: 11/771,429

(22) Filed: Jun. 29, 2007

(65) Prior Publication Data

US 2009/0007135 A1    Jan. 1, 2009

(51) Int. Cl.
*G06F 15/177*    (2006.01)
*G06F 1/24*    (2006.01)
*G06F 9/00*    (2006.01)
*G06F 9/44*    (2006.01)

(52) U.S. Cl.
USPC ........... 709/221; 709/223; 709/224; 709/226; 713/100; 717/168; 717/171; 717/172; 717/173

(58) Field of Classification Search
USPC ........................................................ 709/221
See application file for complete search history.

(56) References Cited

U.S. PATENT DOCUMENTS

| | | | |
|---|---|---|---|
| 6,058,490 | A | 5/2000 | Allen et al. |
| 6,574,477 | B1 | 6/2003 | Rathunde |
| 6,920,320 | B2 | 7/2005 | Rathunde et al. |
| 7,127,637 | B2 | 10/2006 | Rathunde et al. |
| 7,134,046 | B2 | 11/2006 | Rathunde et al. |
| 7,149,918 | B2 | 12/2006 | Rathunde et al. |
| 7,219,254 | B2 | 5/2007 | Rathunde et al. |
| 7,594,262 | B2 * | 9/2009 | Hanzlik et al. .................. 726/15 |
| 2004/0024853 | A1 * | 2/2004 | Cates et al. .................... 709/223 |
| 2004/0071164 | A1 * | 4/2004 | Baum ........................... 370/469 |

* cited by examiner

*Primary Examiner* — Douglas B. Blair
*Assistant Examiner* — Angela Nguyen
(74) *Attorney, Agent, or Firm* — Fay Sharpe LLP

(57) ABSTRACT

Methods and systems are presented for updating software applications in a processor cluster, in which the cluster is divided into first and second processor groups and the first group is isolated from clients and from the second group with respect to network and cluster communications by application of IP filters. The first group of processors is updated or retrofitted with the new software and brought to a ready-to-run state while the second group is active to serve clients. The first group is then transitioned to an in-service state after isolating the then-active service providing application on second group. Thereafter, the second group of processors is offlined, updated or retrofitted, and transitioned to an in-service state to complete the installation of the new application version across the cluster with reduced or zero downtime and without requiring backward software compatibility.

21 Claims, 8 Drawing Sheets

APPARATUS AND METHOD FOR SERVER NETWORK MANAGEMENT TO PROVIDE ZERO PLANNED RETROFIT DOWNTIME

FIELD OF THE INVENTION

This invention relates generally to the field of server network management and more particularly to improved methods and apparatus for software updates or retrofits in a cluster of networked processors to reduce or avoid planned retrofit downtime.

BACKGROUND OF THE INVENTION

Networked processors are typical in modern telecommunications systems and other systems in which a plurality of servers or other processors are interconnected by one or more networks and are individually configured to run instances of the same application software, where this set of processors is sometimes referred to as a cluster. The use of clustered processors is particularly advantageous for high availability systems such as telecommunications, e-commerce, and other situations in which a network can accommodate a potentially large number of application instances. A cluster can include high availability software and provide for application redundancy schemes/approaches using processors of the cluster, where the high availability software can be part of the application software and/or may be separate code, such as middleware. In telecommunications systems, such clusters are found in a variety of situations, such as server banks providing radio network controller (RNC) functions associated with base station controllers in a wireless network, where each application processor (AP) may be running an instance of the same application for managing access network resources such as radios and channels, as well as to manage call processing, signaling, data traffic processing, etc.

As application software evolves, new versions are produced, whether major version updates or upgrades to fix bugs and/or retrofits to add new features, where the new version of a given application may change interfaces between elements or add new interfaces/processes or otherwise create a compatibility issue with respect to a previous version. In these situations, it is desirable or necessary to ensure that either the new software update or retrofit is completely backward compatible, or that all the processors in the cluster are updated or retrofitted at the same time, i.e., that two incompatible versions are not running on different processors at the same time in an active cluster. In addressing the ever-changing landscape of software application functionality, it is costly and difficult to design new software to be backward compatible with previous versions. Thus, many new software versions, particularly those that add or change interfaces among components, are not backward compatible. In this situation, one approach is to take all the processors off-line (i.e., shutdown the service providing application) and perform software updates/retrofits at once. However, in telecommunications systems and other applications, extended downtime is undesirable, even if planned. Furthermore, it may be undesirable in high availability situations to perform a complete software version update or retrofit all at once in case there are problems with the new version. Thus, there remains a need for improved methods and systems for updating or retrofitting software applications in a cluster of processors running an application to service clients by which the difficulties associated with non-backward compatible software can be mitigated or overcome without excessive system downtime.

SUMMARY OF THE INVENTION

The following is a summary of one or more aspects of the invention to facilitate a basic understanding thereof, wherein this summary is not an extensive overview of the invention, and is intended neither to identify certain elements of the invention, nor to delineate the scope of the present invention. Rather, the primary purpose of the summary is to present some concepts of the invention in a simplified form prior to the more detailed description that is presented hereinafter. The various aspects of the present disclosure relate to network management and updating or retrofitting software applications in a cluster of processors, which may be advantageously implemented to reduce or mitigate the aforementioned difficulties without requiring backward software version compatibility and without excessive system downtime.

In accordance with one or more aspects of the present disclosure, a method is provided for updating or retrofitting software applications in a cluster of operatively coupled processors running an application to service clients. The method comprises dividing or segmenting the cluster into two processor groups, each group including one or more processors, and isolating the first group from clients and from processors of the second group with respect to network and cluster communication related to the application. The first and second groups may be equal or roughly the same (i.e., within one processor of one another), or if different, the smaller group preferably includes a sufficient number of processors to service the clients while the larger group is offline. Isolation of the groups in one embodiment involves applying IP filters to processors and ports of the first group so as to isolate the filtered processors from the second group of processors and from the clients.

With the second group still actively servicing client sessions, the application software is updated or retrofitted for the first group, and the first group is initialized, for example, behind an IP filter firewall in one embodiment. Address resolution protocol (ARP) may be disabled and static routes may be setup for the first group of processors prior to transitioning the first group to a ready-to-run state so that the first and second groups of processors can effectively share the same IP addresses (if virtual IP addresses are used by the service providing application) while isolated from one another. The application states on the first group are then brought up to the ready-to-run state on the new software version or release, in which client access to the first group of processors can be quickly enabled after blocking the previous version of the service providing application active on the second processor group. In this manner, a controlled split cluster environment is temporarily established and managed by creating two isolated instances of the application on different application versions, one of which is in-service or active while the other is managed in partial operating condition on the update or retrofit (newer) version.

The application states of the second processor group can then be transitioned from active to a ready-to-run state, and the second group may then be isolated from the clients and from the first group, such as through application of IP filters to processors and ports of the second group of processors. The method may further include removing the IP filters from the processors and ports of the first group of processors and bringing the application states on the first group of processors to an in-service state. This can be followed by updating or retrofitting the application on the second group of processors to complete the retrofit procedure. Optionally, a "soak" period may be provided prior to updating the second group of processors, in which the second group is held at a ready-to-run state on the old version to allow quick backout in case there are problems with the newer software version. Once any optional soak period is finished and the second group of processors has been updated/retrofitted, the application states on the second processor group are transitioned to an in-service state, after which load balancing and normal operation can be resumed. Since the first group is transitioned to a ready-to-run state prior to isolating the second group, the disclosure facilitates quick switchover without extended service interruptions, thereby making the invention ideal for telecommunications or other implementations in which zero or short planned retrofit or update downtime is important. Moreover, the solution ensures that two different versions of the software application are not active at the same time, whereby there is no need to design software for full backward compatibility between different versions of the service providing application. Moreover, exemplary embodiments allow for quick backout in case of problems with a new application version.

In accordance with further aspects of the disclosure, a system is provided for updating or retrofitting software applications in a cluster of operatively coupled processors running an application to service clients. The system includes means for segmenting a cluster of operatively coupled processors running an application into first and second groups of processors, the first and second groups individually including at least one processor of the cluster, means for isolating the first group from clients and from the second group with respect to network and cluster communications related to the application being updated or retrofitted, means for updating or retrofitting the application on the first group of processors, means for bringing the application states on the first group to a ready-to-run state, means for bringing the application states on the first group of processors to an in-service state, means for updating or retrofitting the application on the second group, and means for bringing the application states on the second group to an in-service state.

Still other aspects of the disclosure provide a computer-readable medium having computer-executable instructions for performing steps of segmenting a cluster of operatively coupled processors running an application into first and second groups of processors, isolating the first group of processors from clients and from processors of the second group with respect to network and cluster communications related to the application, updating or retrofitting the application on the first group of processors, bringing the application states on the first group of processors to a ready-to-run state, bringing the application states on the first group of processors to an in-service state, updating or retrofitting the application on the second group of processors, and bringing the application states on the second group of processors to an in-service state.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings, in which.

DETAILED DESCRIPTION OF THE INVENTION

Figure 1:
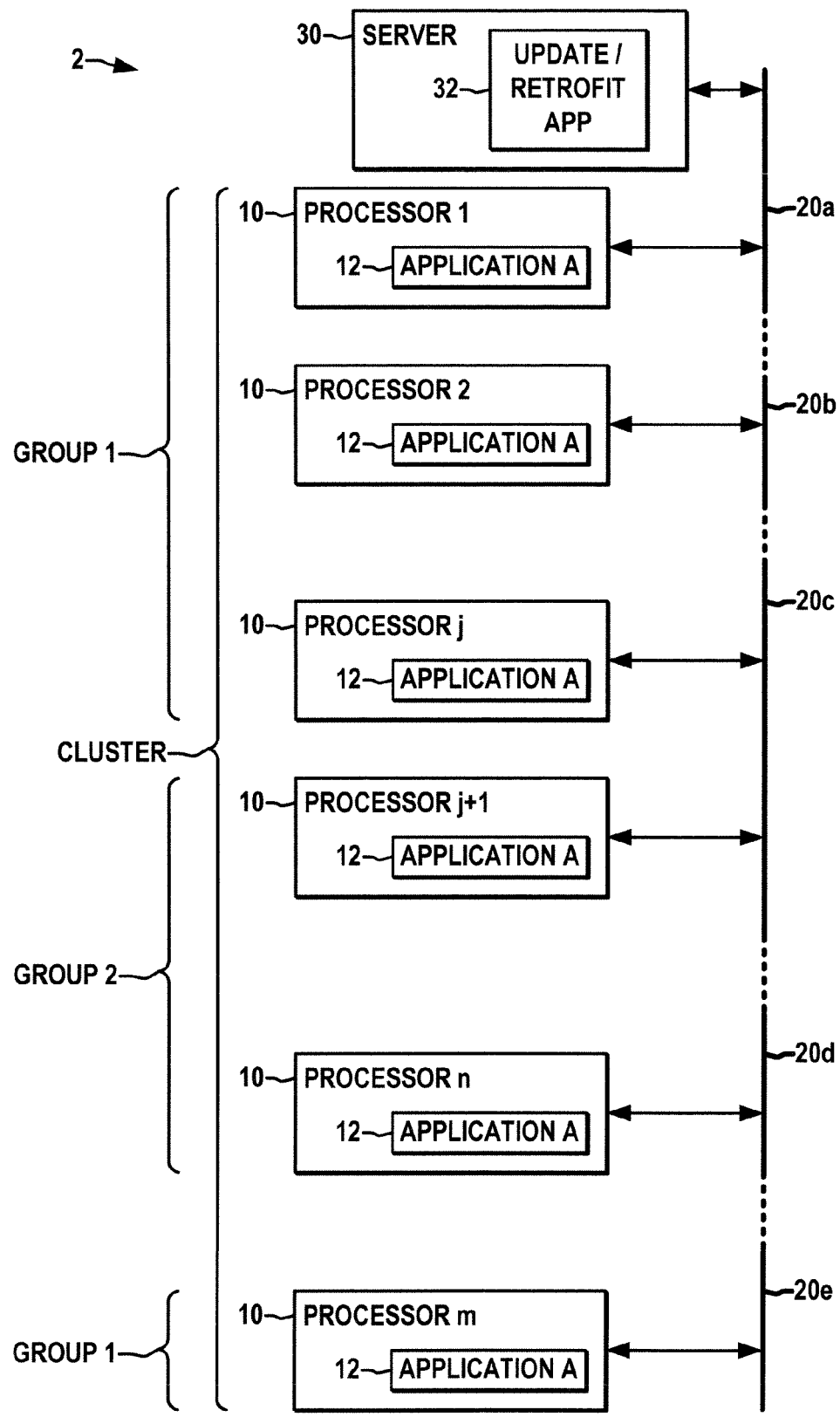
FIG. 1 is a simplified schematic diagram illustrating an exemplary processor cluster with a plurality of processors operatively coupled to one another via a series of networks and logically segmented into first and second processor groups for updating or retrofit of application software via a retrofit/update application running on a network server in accordance with one or more aspects of the present disclosure.

Referring now to the figures, several embodiments or implementations of the various aspects of the present disclosure are hereinafter illustrated and described in conjunction with the drawings, wherein like reference numerals are used to refer to like elements. FIG. 1 illustrates an exemplary processor cluster 2 with a plurality of processors 10 operatively coupled to one another via a series of networks 20 in which one or more aspects of the disclosure may be carried out. In the illustrated example, the cluster includes an integer number "m" processors 10 operatively coupled with one another via various networks 20a, 20b, 20c, 20d, and 20e, where each processor 10 is configured to run one or more instances of the same application software 12.

The processors may be any form of processing component, such as servers, processor boards, etc., and the networks 20 may be of any suitable topology and construction, including without limitation wired, wireless, and combinations thereof. A network server 30 is also provided, which runs an update/retrofit application 32 for implementing the various updating and retrofitting of the processors 10 according to the functionality described herein. Other implementations are possible in which all or parts of the retrofit procedure (including processor selection) need not be implemented and/or managed from an external server, for instance, wherein for a UMTS RNC, the main control of the procedure may be run from a designated server in each of the two selected processor groups. In such an implementation, the update/retrofit communication messages (e.g., such as over a separate/unique subnet) will not be blocked by IP filters used in the retrofit procedure between two such designated servers. In either form of specific implementation (e.g., EV-DO and UMTS), an external network element management system/server, such as the exemplary server 30 in FIG. 1 may advantageously be provided in the network under user control to start and stop the retrofit on one or more clusters.

As shown in the example of FIG. 1, the update application 32 operates to initially segment the cluster of processors 10 (i.e. PROCESSOR1 through PROCESSOR m in FIG. 1) into two groups, with a first group (GROUP 1) having an integer number "j"+1 processors 10 (PROCESSOR 1 through PROCESSOR j and PROCESSOR m) and the second group (GROUP 2) including an integer number m−j−1 processors (PROCESSOR j+1 through PROCESSOR n). The segmentation by the application 32 in one embodiment can be done to divide the cluster roughly in half (i.e., the first and second groups are roughly the same size) where j=m−j or where j=(m−j)+/−1, such as where m is an odd number. In another possible embodiment, one of the two groups is larger than the other group by two or more.

In accordance with the present disclosure, the application 32 operates to segment the cluster into first and second groups (and possibly more groups) so as to update/retrofit the application 12 in the first group while the second group remains actively servicing clients in the network. In this regard, where one group is smaller than the other, the smaller processor group is preferably selected by the application 32 so as to include enough processors 10 to service the clients when the other (larger) group is offline for updating or retrofitting, wherein the selection of processors 10 for the segmentation can be made according to any suitable selection criteria, and the present invention is not limited to any specific selection method. In one possible example, it may be desirable to define the second group so as to include the processors that are running the application instances that are actively servicing the network elements. For UMTS, for instance, the group definition/selection is dynamic and need not be fixed. Furthermore, it may be undesirable to take a processor off-line if it causes an impact to network clients.

Figure 2:
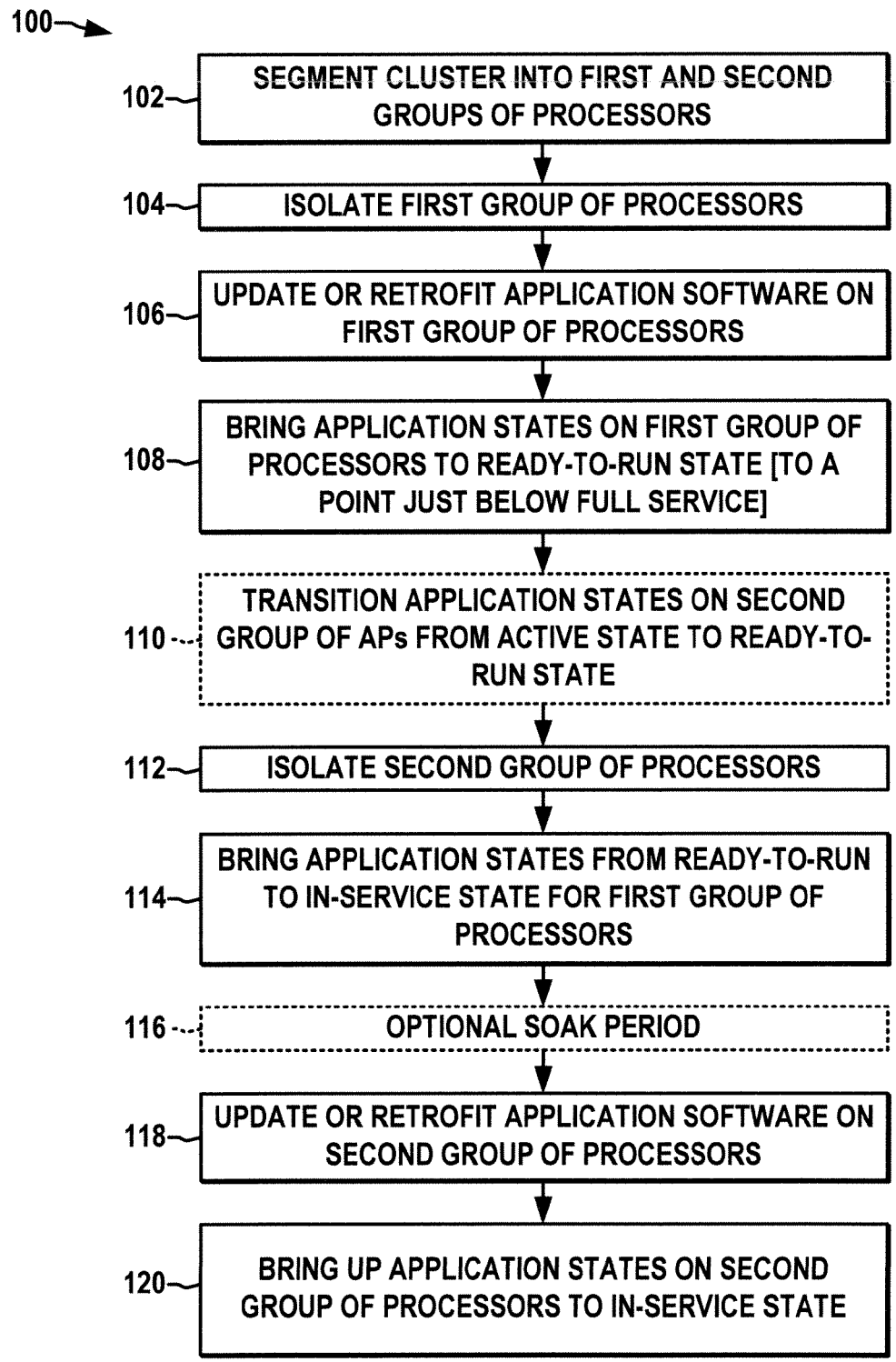
FIG. 2 is a simplified flow diagram illustrating an exemplary method for updating or retrofitting software applications in a processor cluster according to several aspects of the disclosure.

Referring also to FIG. 2, the retrofit/update application 32 is operable generally in accordance with an exemplary method 100 to update or retrofit the software application 12 in processors 10 of the cluster 2 in FIG. 1. Although illustrated and described hereinafter in the context of the server 30 being used to perform some or all acts of the retrofit/update procedure 32, it will be appreciated that many variant implementations are possible in which a different network element or elements may perform the procedures and methods as per the present disclosure, wherein the present invention is not limited to the specifically illustrated or described embodiments. In this regard, one possible implementation could include using the server 30 for a subset of the actions taken as part of the retrofit procedure (32), and with a server in each group being used to carry out some or many of the steps (100) locally. While the exemplary method 100 and other methods of the disclosure are illustrated and described in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those acts and ordering illustrated and described herein, and not all illustrated steps may be required to implement a process or method in accordance with the present invention. The illustrated method 100 and other methods of the invention, moreover, may be implemented in hardware, software, or combinations thereof, in order to provide the application update/retrofit features as described herein, wherein these methods can be practiced in hardware and/or software such as the exemplary server 30 and the retrofit application 32 of the above described system in FIG. 1, or other systems or alternate forms of logic, hardware, or software in any single or multiple entities operatively associated with a processor cluster 2, wherein the invention is not limited to the specific applications and implementations illustrated and described herein. The cluster 2 in this example includes a plurality of processors 10 operatively coupled with one another via one or more networks 20. The original cluster 2 in the illustrated embodiment of FIG. 1 is split or segmented into two groups during the retrofit process 100 so that both parts/groups can boot up active separately as described hereinafter.

The method 100 of FIG. 2 begins at 102 with segmentation of the cluster 2 into first and second groups of processors (e.g. GROUP 1 and GROUP 2 in FIG. 1), where the first and second groups individually include at least one processor 10. At 104, the first group of processors 10 is isolated from clients and from the second group of processors 10 with respect to network and cluster communication related to the application being updated or retrofitted. Any suitable technique may be used at 104 to isolate the selected first group from the other processors and from clients such that clients will continue to be served by the second processor group while the first group is updated/retrofit with new application software 12. In one possible implementation, the isolation of the first group at 104 involves applying IP filters to the processors and ports of the first group to isolate the filtered processors 10 from the second group and from the clients to preclude communications between processors of the two groups with respect to the application. In situations where the original cluster 2 involves high availability software, for example, supporting redundancy with respect to an application being updated, the isolation will also segment the high availability environment. In this manner, high availability software implementing redundancy for the active second group of processors for the application will recognize only processors of the second group and instances of the application running in the second group as available candidates for replication of states, use as redundant instances, etc. In this manner, the two groups are effectively isolated with respect to cluster communications. The application software 12 of the first group of processors 10 is then updated or retrofitted at 106, which may include rebooting if necessary. In one possible embodiment, the method 100 may further provide for disabling an address resolution protocol (ARP) in the first group of processors 10 and setting up static routes for the first group after updating or retrofitting the application on the first group at 106. In particular, the disabling of ARP at 106 is particularly useful for applications using virtual IP addresses to interact with clients to allow the same IP to be used in both groups at the same time when cluster 2 is split but is only visible to external clients from one group (e.g., the second group) during retrofit of the first group.

Thereafter at 108, the application states of the retrofit or updated first group of processors are brought to a ready-to-run state to a level just below that of full service. At this point, the first group or processors 10 is ready to be switched over to active service with IP addresses already having been assigned so that taking the second group offline will not result in lengthy service interruption. In this regard, the present disclosure advantageously provides for having the first group in this ready-to-run state with the newer software version installed while the second group continues to service clients using the previous version of the application 12. It is noted that the optional disabling of ARP and setting static routes advantageously facilitates the use of this temporary split cluster arrangement without confusion resulting from the assignment of a single IP address to different physical MAC addresses of the processor ports in the two groups, by which the first group is ready for the switchover with only minimal time needed to transition to the in-service state.

Thereafter, control is switched to the updated processors 10 of the first group. The application states of the software application 12 on the second group of processors (e.g., at the prior version level in this example) are first transitioned from active to a ready-to-run state at 110. The second group is then isolated at 112 from clients and from the first group of processors 10 by any suitable technique, such as applying IP filters to processors and ports of the second group (or by off-lining or shutting down the service providing application for the second group). The application states of the updated processors of the first group are brought at 114 from the ready-to-run state to in-service. In this fashion, the second group of processors 10 can be ready to resume control of active client sessions, for instance, in the event there are problems with the updated or retrofit version of the application 12 on the first group of processors 10. Thus, the second group may be held ready for such backout operations as needed, for instance, for a predetermined soak period at 116 to assess the stability of the application update or retrofit. The exemplary method 100 further provides for updating or retrofitting the application at 118 on the second group of processors 10, and bringing the application states on the second group of processors to an in-service state at 120.

The update/retrofit application 32 on the server 30 in FIG. 1 thus provides a system for updating or retrofitting the software applications 12 in the cluster 2 of operatively coupled processors 10, wherein the update/retrofit application software 32 may be run exclusively from the server 30 or update/retrofit software components may be installed and run locally on the processors 10 under control of the centralized update application 32 or on other network elements. Moreover, the retrofit/update application 32 may be provided as a computer-readable medium having computer-executable instructions for performing the above described steps to update and/or retrofit the applications 12 on a cluster of processors 10.

Figure 3A:
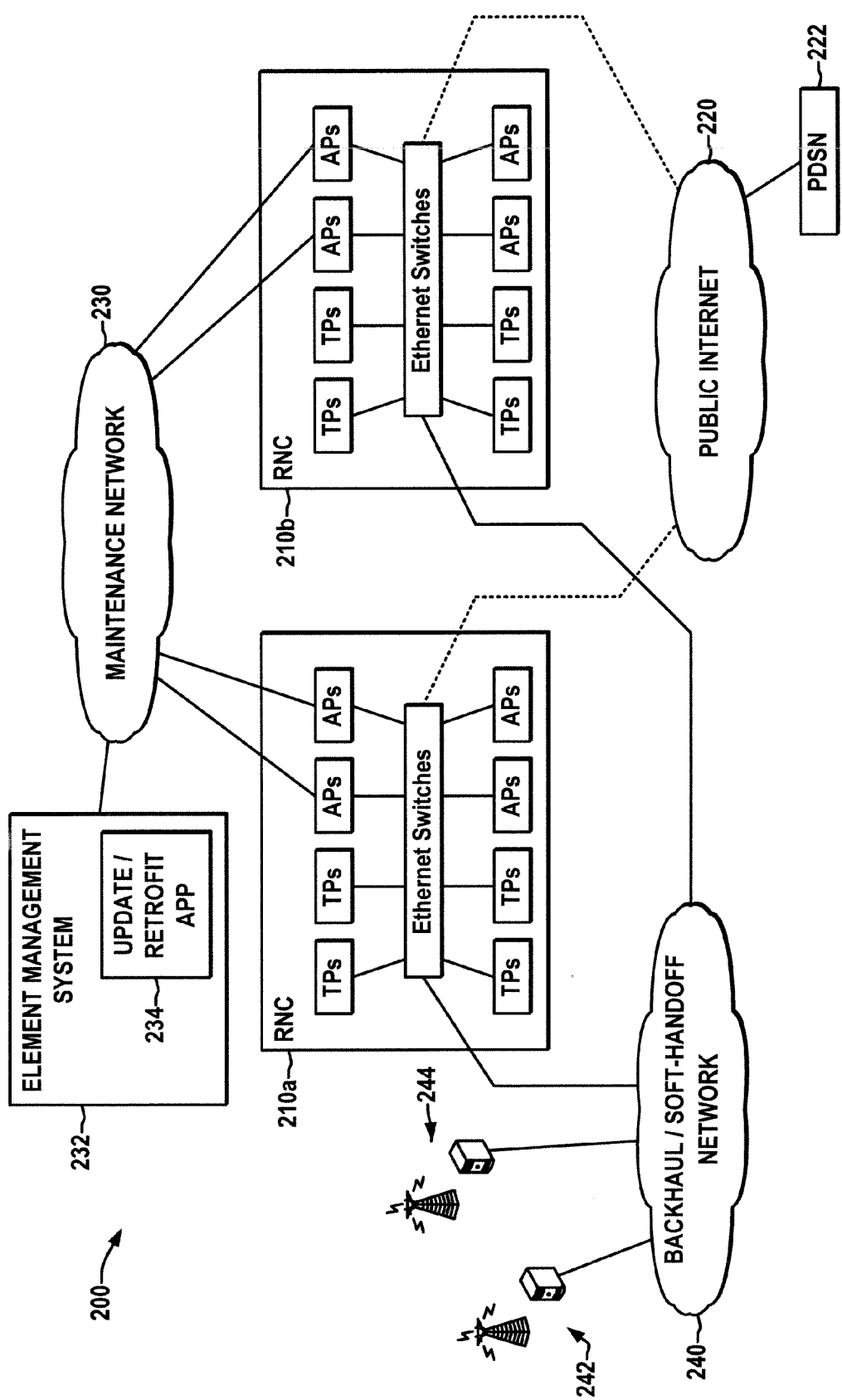
FIG. 3A is a simplified schematic diagram illustrating an exemplary pair of radio network controller banks forming a pair of processor clusters in a telecommunications system in which the cluster processors are divided into groups and updated/retrofit in accordance with the disclosure.

Referring now to FIGS. 3A-4D, further embodiments of the disclosure are presented in the context of a telecommunications system 200, where a pair of 1xEV-DO radio network controller banks (RNCs) 210*a* and 210*b* are shown in FIG. 3A together forming a plurality of processors running instances of an application that is to be updated or retrofitted, and individually constituting a processor cluster. In this example, the two RNCs 210*a* and 210*b* can be retrofit at the same time using the above described techniques, where the processors include application processors (APs) and associated traffic processors (TPs) that are physically divided into two clusters in separate housings (shelves) to service base station cell site clients 242 and 244 via a backhaul/soft-handoff network 240 in a wireless communications system. The APs and TPs can be implemented in certain possible embodiments on the same board, and different processors may be implemented as different processor cores in a single multi-processor device, wherein the present disclosure contemplates any clusters of processors that are operatively coupled with one another and running instances of an application regardless of the physical design/location of the processors/switches within a physical board or chassis or system. In this regard, the illustrated and described update/retrofit techniques can be advantageously employed in the RNC context for selective updating/retrofitting of just the APs with no update or retrofit of the TPs, or applications running on both the APs and TPs can be updated concurrently, where the present disclosure is not limited to the illustrated implementations. The RNCs 210 are also operatively coupled with a PDSN 222 via a public internet network 220, and with an element management system (EMS) 232 via a maintenance network 230 for provisioning and other services including initiating the update/retrofit procedures across the RNCs 210. As best shown in FIG. 3B, the cell clients 242, 244 are operatively coupled with application processors of the RNCs via a cell subnet with the EMS 232 and maintenance network 230 coupled to the APs via an OAM subnet. In addition, the application and traffic processors AP, TP and a chassis alarm card AC of each RNC 210 are coupled with one another via an intra-RNC subnet.

Figure 3B:
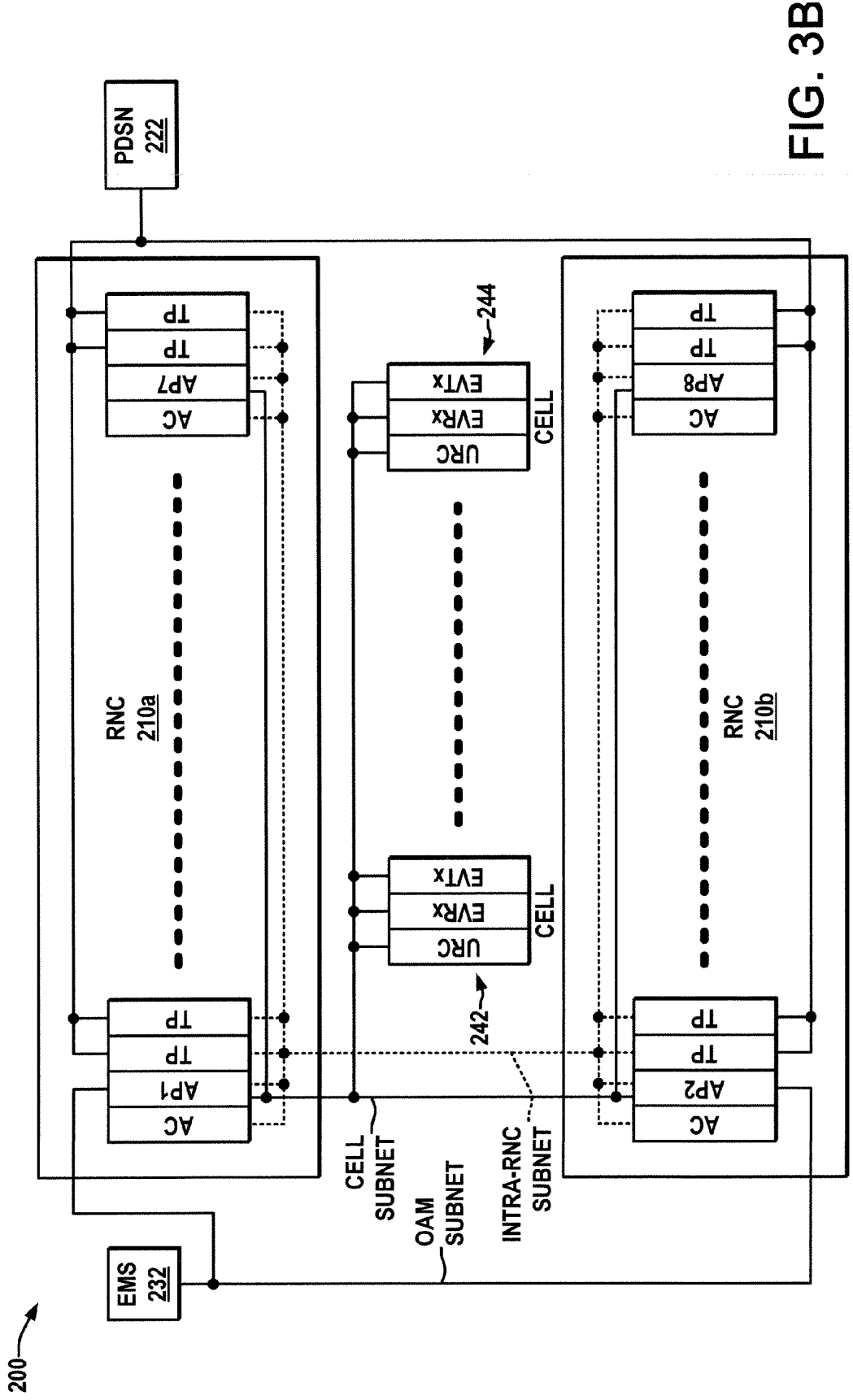
FIG. 3B is a schematic diagram illustrating further details of the exemplary radio network controllers of FIG. 3A.
Figure 4A:
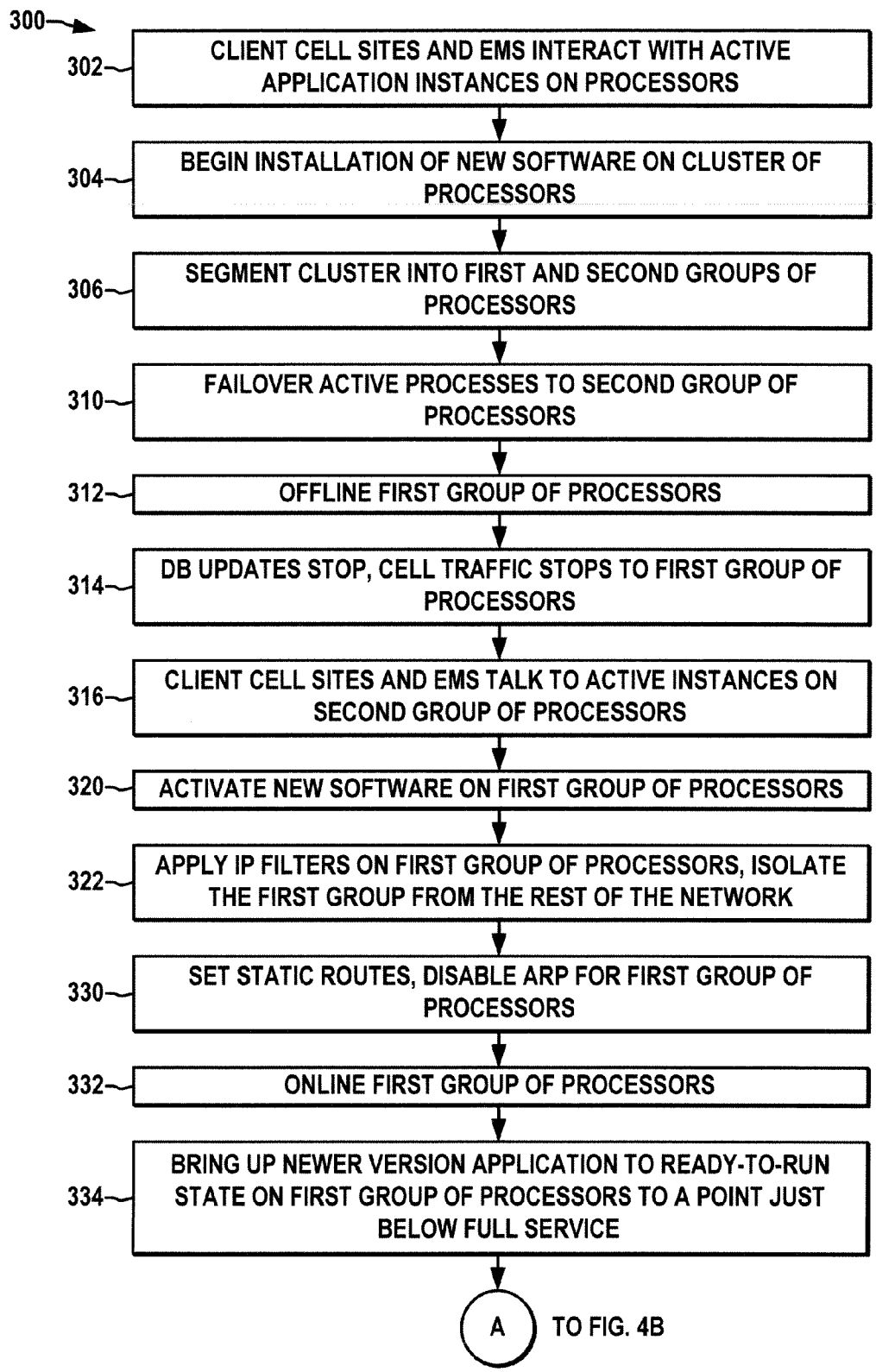
FIGS. 4A-4D provide a flow diagram illustrating another exemplary method of updating/retrofitting a cluster of processors in the radio network controllers of FIGS. 3A and 3B in accordance with the present disclosure.
Figure 4B:
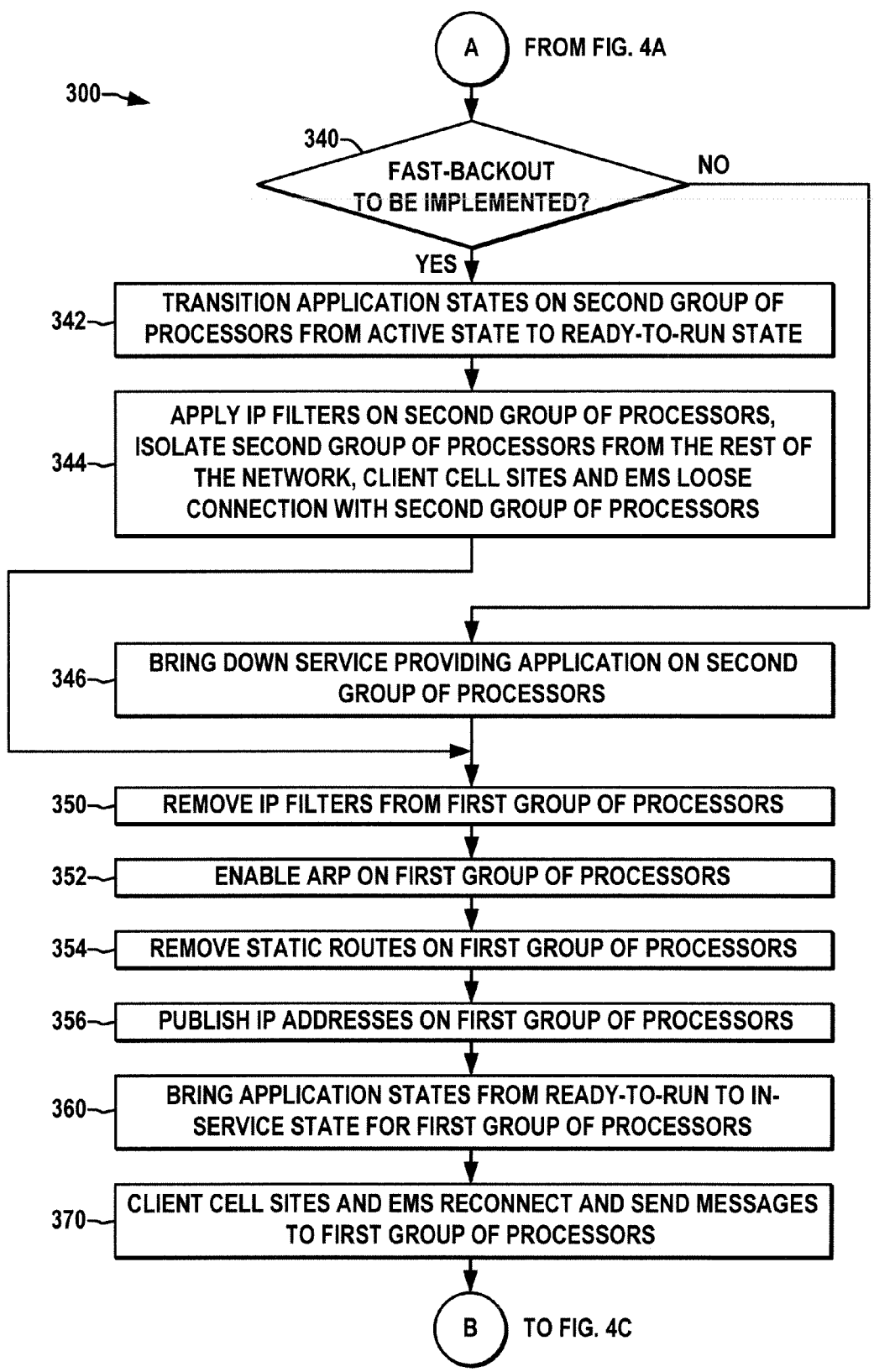
Figure 4C:
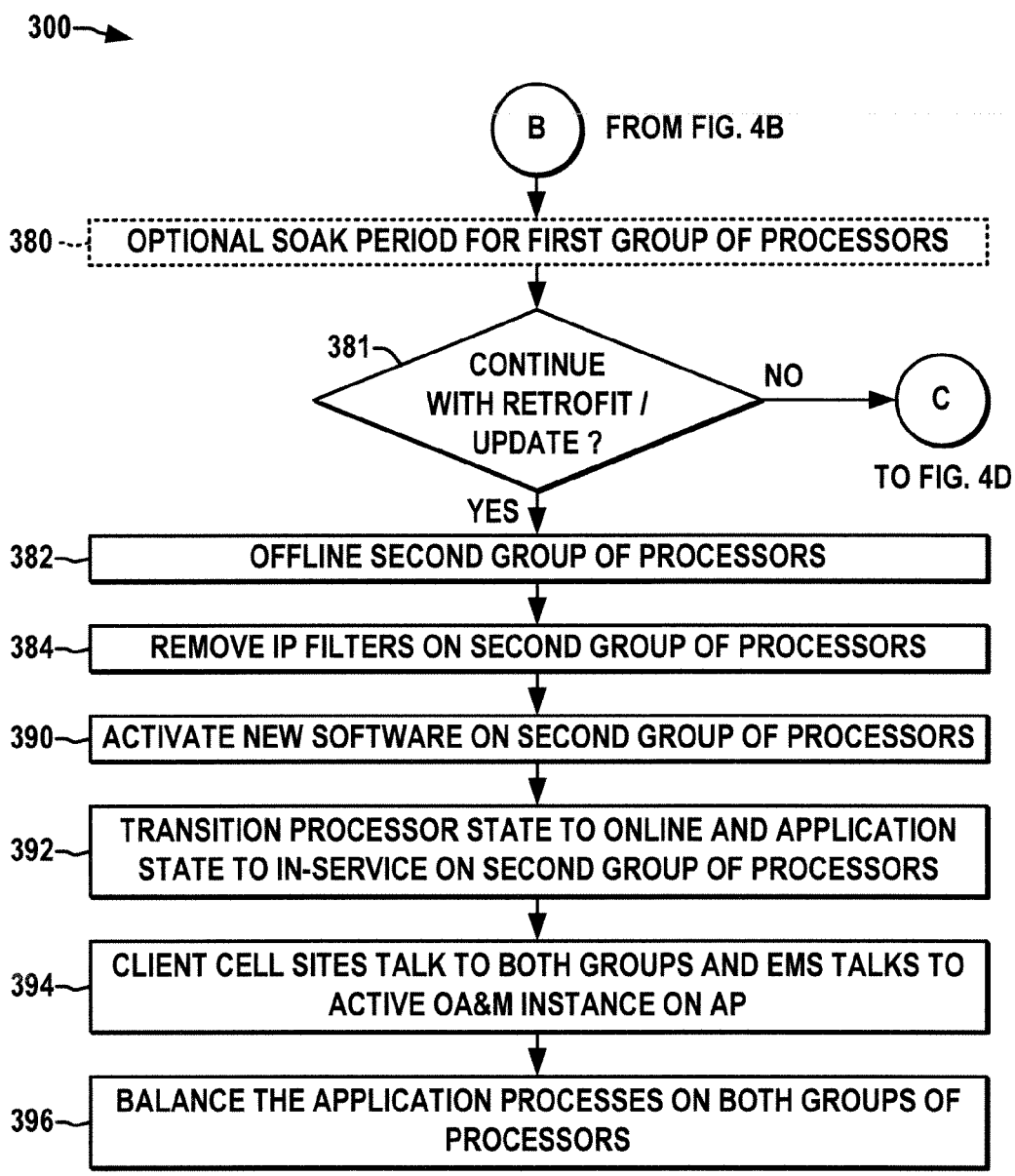

The above described techniques for updating/retrofitting application software can be applied in the telecommunications system of FIGS. 3A and 3B, wherein FIGS. 4A-4C show another exemplary method 300 for updating/retrofitting the cluster of RNC application processors in accordance with the present disclosure. The system of FIGS. 3A and 3B provides the novel zero planned downtime infrastructure and techniques as set forth in the present disclosure for application state and network management across the networked processors AP, TP by using processor-based state and IP filtering controls applied locally on the APs via local scripts invoked by local retrofit software/agents or other suitable means that may be controlled or initiated in some embodiments by an update/retrofit application 234 of the EMS 232 to provide zero planned downtime during retrofit procedures. As discussed above, the timing of application retrofit and update operations is important in such telecommunications situations, as extended periods of lack of service (e.g., greater than 30 seconds) are deemed as "downtime" and it is thus desirable to minimize or eliminate the time during which no application processors AP are operational.

Accordingly, the method 300 is employed as described below to first update the 1xEV RNCs 210 to a new release in a running network prior to software updates for the individual client cell sites 242, 244. The illustrated example, moreover, advantageously employs IP filtering on the AP and TP processors so as to isolate one processor group from the other and from the clients 242, 244 to be retrofitted to a new application version with respect to network and cluster communications related to the application without impacting the applications on the other group. In the illustrated embodiment, moreover, processor-based states and firewall software are employed to manage the network client and server operations while the network is operational to mitigate downtime, and also without requiring backward compatibility between old and new versions of the application and platform software running on the processors. This is accomplished by temporarily splitting the clusters for partial retrofit/upgrade of a group of processors in a first RNC 210*a* and another first group of processors in the second RNC 210*b* to a new version at one time while the remaining processors in the RNCs 210*a* and 210*b* function as second groups that continue performing call-processing functionality on the older version, wherein the first and second processor groups are ideally individually sufficient to support the entire functionality of the application at least for a time during the retrofit.

In the system of FIGS. 3A and 3B, each processor AP, TP communicates via standard IP interfaces to client processors including the cell clients 242, 244, the EMS 232, the PDSN 222, as well as to the other RNC processors in the same system, using Ethernet switches or other suitable switching means. In this system, switches and/or routers are connected to allow for messaging between processors on the same network or subnet, where the processor software application in the RNCs 210 provides redundancy and an instance of the application on one RNC processor communicates with other server processors in that RNC 210 running the same version of the application. During the retrofit with the clusters each split into an active and a retrofit/update group, a given processor is effectively blocked according to the present disclosure from communicating with other server processors running a different release, whereby the prior concerns with backward software compatibility can be mitigated or overcome.

As shown in FIGS. 4A-4D, the method 300 begins at a state where the processors of both RNCs 210 are running an old version of an application, with the client cell sites 242, 244 and the EMS 232 interacting with these application instances of the RNC processors. The installation of new software (e.g., updates, retrofits, etc.) begins at 304 for the clusters formed by the processors AP, TP of the RNCs 210a and 210b. Although illustrated in this embodiment in the context of clusters that include both application and traffic processors, the mechanisms, techniques, and operations of the exemplary method 300 and other methods of the invention may be employed with respect to application instances on both APs and/or TPs based on application needs and operating environment. At 306, the retrofit/update application 234 of the EMS 232 segments the individual clusters each into a first group and a second group of processors, wherein any suitable criteria may be used for dividing the cluster. In one implementation, the groups are equal in size or roughly equal, where the illustrated example involves dividing the clusters in half. Other implementations are possible, in which the groups are not equal, where a smaller groups preferably include enough processors to adequately service the clients 242, 244 and EMS 232 while the larger groups are taken off-line for retrofitting/updating. In the example of FIGS. 3A-4D, the processors of each RNC are segmented into a first group of odd numbered processors and a second group of even numbered processors, although the present disclosure is not limited to this exemplary embodiment.

At 310, active processes of the first group application processors AP are failed over to the second group, and the APs and TPs of the first group are taken offline at 312 under control of the application 234 in the EMS 232. In certain implementations, the processors of the first group could be off-lined at 312 in order to forces the failover of the application at 310, or the steps at 310 and 312 could be combined into a single operation in some other form, wherein it is again noted that the specific ordering of the illustrated acts or events is not a strict requirement of the invention except as specifically noted herein and that one or more illustrated acts or events may be combined, wherein all such variant implementations are contemplated as falling within the scope of the present invention and the appended claims. Database updates and cell traffic to the first group stop at 314 as the service providing application is no longer active on the first group of processors. Client cell cites 242, 244 and the EMS 232 talk to active instances on the second processor group as shown at 316 in FIG. 4A. It is noted that in certain possible embodiments, two or more of the acts at 310, 312, 314, and/or 316 may be implemented as a single step.

The new software (i.e., new version) is activated (e.g., installed but not started) on the first processor group at 320, and IP filters are applied to the first group at 322 so that incoming messages for the first group of processors related to the application of high availability aspects of the application are effectively blocked to isolate the processors of the first group from the clients and from the second group. In this example, the IP filters may be applied at 322 using firewall software to roughly half the cluster processors to maintain the high availability redundancy for processors that remain in the same cluster and provide service to network during the retrofit/update operations. In addition, it is noted that IP filter enabling and or disabling may be selectively implemented for only APs, or for both APs and/or TPs or any desired combination of APs and TPs, wherein all such variant embodiments are contemplated as falling within the scope of the present disclosure.

At 330, static routes are set to allow communication between processors of the (isolated) first group on the intra-RNC communication subnet (FIG. 3B), and address resolution protocol (ARP) is disabled in the first group of processors via operating system mechanisms as are known, in order to manage the treatment of floating IP addresses that are typically configured and associated with only one active application instance on one cluster at a time. In this respect, the novel method 300 seeks to intentionally create a temporary split cluster condition in which two physical MAC addresses may be assigned to a single IP address, where the disabling of the ARP allows this condition to exist in the split cluster without route table contention or misrouted messaging between the clients and server processors since the two groups are effectively isolated by the IP filter application.

At 332, the application processors in the first group are taken to an online processor state, and the application states for the first group are brought up to a ready-to-run state at 334 to a point just below full service. It is noted that other implementations are possible in which the acts at 332 are performed before or concurrently with those at 330. In one embodiment, the ready-to-run application state at 334 provides a state with respect to the application run state and the processor state which causes certain 1xEV application processes in the exemplary system to be in a special partial operating condition managed independent of the processor active or off-line state during the maintenance operation on the first group of processors. This novel state is used internally during the update/retrofit operations to control the application process behavior, including inhibiting call processing while allowing a high degree of initialization to a point just below full service, where the "ready-to-run" application is available to a requesting client 242, 244, 232, etc. The ready-to-run state need not be part of the application, but is available to the application and the operating environment, and may be entered independent of the actually processor state.

By this technique, initializing processes in the isolated first processor group can access new database schema in the same group, initialize all internal data structures, and minimize the amount of work remaining before these processes assume full capabilities. Consequently, subsequent transition to an in-service application state is fast to thereby facilitate reduction or elimination of retrofit downtime in telecommunications systems. In the preferred embodiments, moreover, the application state will remain at ready-to-run even after a server processor is rebooted as may be required as part of a given software application update or retrofit operation.

This novel combination of the state management with IP filter application provides a controlled split cluster condition that can be employed advantageously during a retrofit or update to isolate the first and second groups of processors from each other while permitting two active instances of application software to run in parallel, even where the two groups are running different application versions. In this manner, the state of a server application in the updated (first) group can be ready-to-run with the corresponding first group processor states active and capable of supporting service, while only one application instance running on the second group of processors in this split cluster condition is handling a given 1xEV sessions at any time and is visible to clients in the network. This approach thus allows an application instance on a set of processors to be ready to take control and switch to the new application version by which switchover is fast and downtime is reduced or avoided. Furthermore, the ready-to-run state can be advantageously employed for the second processor group after switchover to facilitate quick backout so that any problems with the software update can be addressed by switching back to the old version on the second group.

Referring particularly to FIG. 4B, the method 300 continues at 340 where a determination is made as to whether such a fast-backout feature is desired. If not (NO at 340), the method proceeds to bring down the active service providing application on the second processor group in order to stop the application from providing service at 346 and the process 300 proceeds to 350 as discussed further below. If fast-backout capability is desired (YES at 340), the application states on the second group of processors are transitioned from active to the ready-to-run state at 342. IP filters are applied at 344 on the second processor group, the second group of processors is isolated from the first group and from the clients, and the client cell sites 242, 244, and EMS 232 thus loose connection with the second group. In this situation, the second group of processors is at an active and capable of supporting service state with the application state thus being all but active, whereby application instances on the second group are ready to resume control on the old application version if needed.

At 350, IP filters are removed with respect to the first group. ARP is then enabled on the first group of application processors at 352, the static routes are removed at 354 for the first group of APs, and the IP addresses are published for the first group at 356. The application states in the first processor group are then brought from ready-to-run to the in-service state at 360. The client cell sites 242, 244, and EMS 232 thus reconnect at 370 with the APs and TPs of the first processor group.

Continuing in FIG. 4C, this operational condition may be maintained at 380 for an optional predefined 'soak' time period with the first group servicing the client sessions on the new updated software version while the second group waits in the ready-to-run state on the old version. This optional soak period at 380 may provide a certain amount of time to determine whether there are any problems with the new software while the second group remains able to quickly provide service in the event a fast-backout is required. A determination is made at 381 as to whether the retrofit/update should continue, e.g., whether the soak period passed. If so (YES at 381), no backout is needed and the second group of processors may then be taken off-line at 382 and the IP filters for the second group are removed at 384 (if applied at 344 above for optional fast backout approach). Otherwise (NO at 381), backout is required, and the process 300 continues as described below in connection with FIG. 4D.

At 390, the new application software is activated on the second group of processors, and the processor states are set to on-line for the second group at 392. At this point, the cluster is no longer split and client cell sites 242, 244, and the EMS 362 communicate with both processor groups in the RNCs 210a and 210b at 394. The normal steady state load balancing can then be resumed at 396 to balance workload (e.g., the application processes on the APs) of the former first and second groups to complete the update/retrofit method 300. In the context of the exemplary RNC implementation of FIGS. 3A-4D, balancing of the active processes on the APs at 396 may be particularly applicable to EV-DO RNCs, whereas UMTS RNC workload is distributed to processors as new calls come in, wherein the load balancing at 396 generally involves and suitable form or balancing the workload across the updated/retrofitted APs.

It is noted in the example of FIGS. 3A-4D that the novel update/retrofit techniques can be implemented in any suitable operating system, including without limitation UNIX, Linux, VxWorks, and other OS software on server processors, and that firewall software may be advantageously used to provide controlled application of IP address and port level filters to manage traffic in and out of the server processors and processes. With respect to telecommunications applications, moreover, the disclosure may find utility in association with development of CDMA networks using cPCI and CPSB platforms, work station platforms, and the migration of existing applications to the next-generation ATCA platforms among others, and may be applied without limitation to IP over Ethernet, ATM, T1, WiMAX, etc.

Figure 4D:
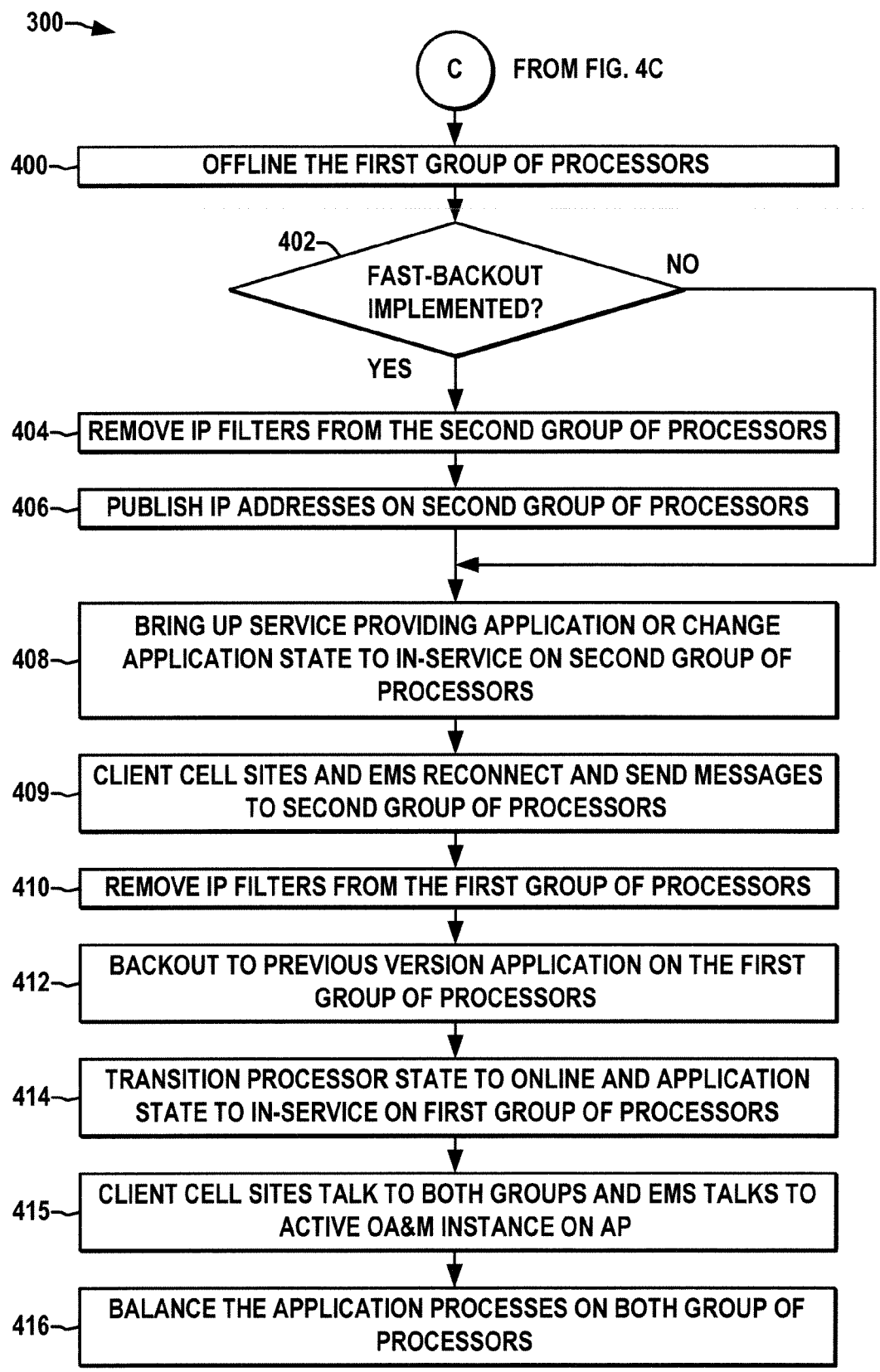

Referring also to FIG. 4D, if backout is required (NO at 381 in FIG. 4C above), the process 300 continues at 400 in FIG. 4D. In this situation, the first group of APs is offlined at 400, and a determination is made at 402 as to whether fast-backout is implemented. If not (NO at 402), the process 300 continues to 408 as described further below. If fast-backout is to be done (YES at 402), the IP filters for the first group of processors are removed at 404, and IP addresses are published at 406 for the second group of APs. At 408, the service providing application is brought up (if fast-backout not implemented) or the application state is changed to in-service (for fast-backout implemented case) for the second group.

At 409, the client cell sites 242, 244, and the EMS 232 reconnect and send messages to the second group of APs and TPs. At 410, IP filters are removed for the first group, and the first group of processors is then backed out to the earlier application version at 412. At 414, the processor state of the first group is transitioned to online and the application state is transitioned to in-service. At 415, the client cell sites 242, 244 talk to both groups and the EMS 232 talks to active OA&M instance on the AP. Thereafter, the application processes of both groups are balanced at 416.

While the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method of updating or retrofitting software applications in a cluster of operatively coupled processors running an application to service clients, the method comprising:

segmenting the cluster of operatively coupled processors running the software application into first and second groups of processors, the first and second groups of processors individually including at least one processor of the cluster;

applying IP filters to the processors and ports of each of the first group of processors to isolate the first group of processors from service clients and from the second group of processors with respect to a network and a cluster communication related to the software application;

updating or retrofitting the software application on the first group of processors;

bringing application states on the first group of processors from an active state to a ready-to-run state in which the software application on the first group of processors is active and partially initialized but not in-service;

transitioning application states on the second group of processors from an active state to a ready-to-run state in which the application on the second group of processors is active and partially initialized but not in-service;

isolating the second group of processors from service clients and from processors of the first group;

bringing application states on the first group of processors to an in-service state;

updating or retrofitting the software application on the second group of processors; and bringing application states on the second group of processors to an in-service state.

2. The method of claim 1, wherein the first and second groups of processors include roughly the same number of processors.

3. The method of claim 1, wherein the first and second groups of processors include different numbers of processors, and wherein the smaller of the first and second groups of processors includes enough processors to service the clients when the other group is offline.

4. The method of claim 1, further comprising removing the IP filters from the processors and ports of the first group of processors after bringing application states on the first group of processors to the in-service state.

5. The method of claim 1, further comprising waiting a predetermined period of time after bringing application states on the first group of processors to an in-service state and before updating or retrofitting the software application on the second group of processors.

6. The method of claim 1, further comprising disabling an address resolution protocol in the first group of processors and setting up static routes for the first group of processors after updating or retrofitting the software application on the first group of processors and before bringing application states on the first group of processors to a ready-to-run state.

7. The method of claim 1, wherein bringing application states on the first group of processors to the ready-to-run state temporarily establishes a controlled split cluster environment with two isolated instances of the software application on different software application versions, with the second group of processors being in-service or active while the first group of processors is managed in a partial operating condition on a newer version of the application.

8. The method of claim 1, wherein the IP filters are applied to the processors and ports of each of the first group of processors using firewall software running on the first group of processors.

9. The method of claim 5, further comprising:
during the predetermined period of time and before updating or retrofitting the software application on the second group of processors, determining whether a problem exists with the updated or retrofit version of the software application on the first group of processors; and
if the problem exists with the updated or retrofit version of the software application on the first group of processors:
taking the first group of processors offline,
removing the IP filters for the first group of processors,
publishing IP addresses for the second group of processors,
changing application state to in-service for the second group of processors,
backing the first group of processors out to an earlier software application version,
transitioning a processor state of the first group of processors to online, and
transitioning application state of the first group of processors to in-service.

10. A system for updating or retrofitting software applications in a cluster of operatively coupled processors running a software application to service clients, comprising:
a network server operatively coupled with the cluster of operatively coupled processors running the software application, the network server running an update/retrofit application;
the network server operative to segment the cluster of operatively coupled processors into first and second groups of processors, the first and second groups individually including at least one processor of the cluster;
the network server operative to apply IP filters to processors and ports of each of the first group of processors to isolate the first group of processors from service clients and from the second group of processors with respect to network and cluster communication related to the application;
the network server operative to update or retrofit the software application on the first group of processors;
the network server operative to bring application states on the first group of processors from an active state to a ready-to-run state in which the software application on the first group of processors is active and partially initialized but not in-service;
the network server is operative to transition application states on the second group of processors from an active state to the ready-to-run state in which the software application on the second group of processors is active and partially initialized but not in-service;
the network server is operative to isolate the second group of processors from clients and from the first group of processors after bringing application states on the first group of processors to the ready-to-run state and before bringing application states on the first group of processors to the in-service state;
the network server operative to bring application states on the first group of processors to the in-service state;
the network server operative to update or retrofit the software application on the second group of processors; and
the network server operative to bring application states on the second group of processors to the in-service state.

11. The system of claim 10, wherein the network server is operative to disable an address resolution protocol in the first group of processors and wherein the network server is operative to set up static routes for the first group of processors after updating or retrofitting the software application on the first group of processors and before bringing the application states on the first group of processors to the ready-to-run state.

12. The system of claim 10, wherein the network server is operative to bring application states on the first group of processors to the ready-to-run state to temporarily establish a controlled split cluster environment with two isolated instances of the software application on different software application versions, with the second group of processors being in-service or active while the first group of processors is managed in a partial operating condition on a newer version of the software application.

13. The system of claim 10, wherein the network server is operative:
- to wait a predetermined period of time after bringing application states on the first group of processors to the in-service state and before updating or retrofitting the software application on the second group of processors;
- during the predetermined period of time and before updating or retrofitting the application on the second group of processors to determine whether a problem exists with the updated or retrofit version of the application on the first group of processors; and
- if the problem exists with the updated or retrofit version of the software application on the first group of processors, to:
  - take the first group of processors offline,
  - remove the IP filters for the first group of processors,
  - publish IP addresses for the second group of processors,
  - change application state to in-service for the second group of processors,
  - back the first group of processors out to an earlier software application version,
  - transition a processor state of the first group of processors to online, and
  - transition application state of the first group of processors to in-service.

14. The system of claim 12, wherein the network server is operative to disable an address resolution protocol in the first group of processors and setting up static routes for the first group of processors after updating or retrofitting the software application on the first group of processors and before bringing application states on the first group of processors to the ready-to-run state.

15. A non-transitory computer-readable medium having computer-executable instructions for performing steps comprising:
- segmenting a cluster of operatively coupled processors running a software application into first and second groups of processors, the first and second groups of processors individually including at least one processor of the cluster;
- applying IP filters to processors and ports of each of the first group of processors to isolate the first group of processors from service clients and from the second group of processors with respect to a network and cluster communication related to the software application;
- updating or retrofitting the software application on the first group of processors;
- bringing application states on the first group of processors from an active state to a ready-to-run state in which the software application on the first group of processors is active and partially initialized but not in-service;
- transitioning application states on the second group of processors from an active state to the ready-to-run state in which the software application on the second group of processors is active and partially initialized but not in-service;
- isolating the second group of processors from service clients and from the first group of processors;
- bringing application states on the first group of processors to an in-service state;
- updating or retrofitting the software application on the second group of processors; and
- bringing application states on the second group of processors to the in-service state.

16. The non-transitory computer-readable medium of claim 15, comprising computer-executable instructions for bringing application states on the first group of processors to the ready-to-run state to temporarily establish a controlled split cluster environment with two isolated instances of the software application on different software application versions, with the second group of processors being in-service or active while the first group of processors is managed in a partial operating condition on a newer version of the software application.

17. The non-transitory computer-readable medium of claim 15, comprising computer-executable instructions for:
- waiting a predetermined period of time after bringing the application states on the first group of processors to an in-service state and before updating or retrofitting the application on the second group of processors;
- during the predetermined period of time and before updating or retrofitting the application on the second group of processors, determining whether a problem exists with the updated or retrofit version of the application on the first group of processors; and
- if a problem exists with the updated or retrofit version of the application on the first group of processors:
  - taking the first group of processors offline,
  - removing the IP filters for the first group of processors,
  - publishing IP addresses for the second group of processors,
  - changing the application state to in-service for the second group of processors,
  - backing the first group of processors out to an earlier application version,
  - transitioning a processor state of the first group of processors to online, and
  - transitioning the application state of the first group of processors to in-service.

18. The non-transitory computer-readable medium of claim 16, comprising computer-executable instructions for disabling an address resolution protocol in the first group of processors and setting up static routes for the first group of processors after updating or retrofitting the software application on the first group of processors and before bringing the software application states on the first group of processors to the ready-to-run state.

19. A method of updating or retrofitting software applications in a cluster of operatively coupled processors running a software application to service clients, the method comprising:
- segmenting a cluster of operatively coupled processors running an application into first and second groups of processors, the first and second groups of processors individually including at least one processor of the cluster;
- applying IP filters to processors and ports of each of the first group of processors to isolate the first group of processors from service clients and from the second group of processors with respect to network and cluster communication related to the application;
- updating or retrofitting the software application on the first group of processors;
- bringing application states on the first group of processors from an active state to a ready-to run state in which the application on the first group of processors is active and partially initialized but not in-service;
- isolating the second group of processors from service clients and from processors of the first group;
- bringing application states on the first group of processors to an in-service state;
- updating or retrofitting the software application on the second group of processors; and bringing application states on the second group of processors to the in-service state.

20. The method of claim 19, comprising:

waiting a predetermined period of time after bringing application states on the first group of processors to in-service state and before updating or retrofitting the software application on the second group of processors;

during the predetermined period of time and before updating or retrofitting the software application on the second group of processors, determining whether a problem exists with the updated or retrofit version of the software application on the first group of processors; and if the problem exists with the updated or retrofit version of the software application on the first group of processors:
  taking the first group of processors offline,
  removing the IP filters for the first group of processors,
  publishing IP addresses for the second group of processors,
  changing application state to in-service for the second group of processors,
  backing the first group of processors out to an earlier software application version,
  transitioning a processor state of the first group of processors to online, and
  transitioning application state of the first group of processors to in-service.

21. The method of claim 19, wherein updating or retrofitting the application on the first group of processors includes retrofitting the first group of processors with a new version of the software application that is not backward compatible with a prior version of the software application on the second group of processors, and wherein bringing the application states on the first group of processors to the ready-to run state includes allowing initializing processes in the first group of processors to access new database schema in the first group of processors and initializing all internal data structures with the first group of processors.

* * * * *